US007984504B2

(12) United States Patent
Hernacki et al.

(10) Patent No.: US 7,984,504 B2
(45) Date of Patent: *Jul. 19, 2011

(54) NETWORK RISK ANALYSIS

(75) Inventors: Brian Hernacki, San Carlos, CA (US); Jeremy Bennett, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 12/215,112

(22) Filed: Jun. 24, 2008

(65) Prior Publication Data

US 2008/0289043 A1  Nov. 20, 2008

Related U.S. Application Data

(63) Continuation of application No. 10/349,155, filed on Jan. 21, 2003, now Pat. No. 7,409,721.

(51) Int. Cl.
*G06F 11/00* (2006.01)

(52) U.S. Cl. ............ 726/25; 726/23; 713/151; 713/165; 713/166; 713/167; 709/224

(58) Field of Classification Search .................... 726/23, 726/25; 713/151, 165–167; 709/224
See application file for complete search history.

(56) References Cited

U.S. PATENT DOCUMENTS

| 5,278,901 | A | 1/1994 | Shieh et al. |
|---|---|---|---|
| 5,557,742 | A | 9/1996 | Smaha et al. |
| 5,574,898 | A | 11/1996 | Leblang et al. |
| 5,621,889 | A | 4/1997 | Lermuzeaux et al. |
| 5,638,509 | A | 6/1997 | Dunphy et al. |
| 5,649,194 | A | 7/1997 | Miller et al. |
| 5,680,585 | A | 10/1997 | Bruell |
| 5,724,569 | A | 3/1998 | Andres |
| 5,757,913 | A | 5/1998 | Bellare et al. |
| 5,778,070 | A | 7/1998 | Mattison |
| 5,844,986 | A | 12/1998 | Davis |
| 5,978,791 | A | 11/1999 | Farber et al. |
| 6,134,664 | A | 10/2000 | Walker |
| 6,269,447 | B1 | 7/2001 | Maloney et al. |
| 6,393,386 | B1 * | 5/2002 | Zager et al. ................ 703/25 |
| 6,556,989 | B1 | 4/2003 | Naimark et al. |
| 6,578,025 | B1 * | 6/2003 | Pollack et al. ................ 1/1 |
| 6,681,331 | B1 | 1/2004 | Munson et al. |
| 6,826,697 | B1 | 11/2004 | Moran |
| 7,353,511 | B1 * | 4/2008 | Ziese ................ 717/178 |
| 7,624,447 | B1 * | 11/2009 | Horowitz et al. ................ 726/23 |
| 7,664,845 | B2 * | 2/2010 | Kurtz et al. ................ 709/224 |
| 2002/0078381 | A1 * | 6/2002 | Farley et al. ................ 713/201 |

(Continued)

OTHER PUBLICATIONS

Bace, R., Introduction to Intrusion Detection Assessment, no date, for System and Network Security Management.

(Continued)

*Primary Examiner* — Kambiz Zand
*Assistant Examiner* — Tongoc Tran
(74) *Attorney, Agent, or Firm* — Hunton & Williams LLP (57) ABSTRACT

Analyzing security risk in a computer network includes receiving an event associated with a selected object in the computer network, and determining an object risk level for the selected object based at least in part on an event risk level of the event received, wherein the event risk level accounts for intrinsic risk that depends at least in part on the event that is received and source risk that depends at least in part on a source from which the event originated.

18 Claims, 13 Drawing Sheets

U.S. PATENT DOCUMENTS

| | | | |
|---|---|---|---|
| 2002/0083168 A1* | 6/2002 | Sweeney et al. | 709/224 |
| 2002/0083343 A1 | 6/2002 | Crosbie et al. | |
| 2003/0046582 A1* | 3/2003 | Black et al. | 713/201 |
| 2003/0154393 A1* | 8/2003 | Young | 713/200 |
| 2003/0204632 A1 | 10/2003 | Willebeek-Lemair et al. | |

OTHER PUBLICATIONS

Kim and Spafford, "Writing, Supporting and Evaluating Tripware: A Publically Available Security Tool", Mar. 12, 1994, Purdue Technical Report; Purdue University.

Latham, Department of Defense Trusted Computer System Evaluation Criteria, Dec. 1985, Department of Defense Standard.

Lunt et al., A Real-Time Intrusion-Detection Expert System (IDES), Feb. 28, 1992, SRI International Project 6784.

Moran et al. DERBI: Diagnosis, Explanation and Recovery From Break-Ins, no date, Artificial Intelligence Center SRI International.

Norvill, T., "Auditing and Event Correction", Department of IT & EE, University of Queensland, 2001.

Pennington, A.G., et al., "Storage-Based Intrusion Detection: Watching Storage Activity for Suspicious Behavior", Carnegie Mellon University, USENIX Security Symposium, Aug. 2003.

Staniford-Chen et al., "GrIDS—A Graph Based Intrusion Detection System for Large Networks", University of California a, Davis, Davis, CA 95616. Proceedings of the 19$^{th}$ National Information Systems Security Conference, vol. 1, pp. 361-370, Oct. 1996, Retrieved from the Internet at: http://citeseer.nj.nec.com1artidelstanifordchen96grids.html.

Tyson, Ph.D., Explaining and Recovering From Computer Break-Ins, Jan. 12, 2001, SRI International.

Unknown, James P. Anderson Co., Computer Security Threat Monitoring and Surveillance, Feb. 26, 1980, Contract 79F296400.

Unknown, Aleph One, Smashing the Stack for Fun and Profit, no date, vol. 7, Issue 49; File 14 of 16 of BugTraq, r00t, and Underground. Org.

* cited by examiner

| Time | Risk Level | Source | Destination | Type |
|---|---|---|---|---|
| $t_1$ | 40 | Object A | Object B | 140 |
| $t_4$ | 50 | Object C | Object A | 3365 |
| $t_6$ | 70 | Object D | Object A | 1180 |

NETWORK RISK ANALYSIS

CROSS REFERENCE TO OTHER APPLICATIONS

This application is a continuation of U.S. patent application Ser. No. 10/349,155, entitled NETWORK RISK ANALYSIS filed Jan. 21, 2003 now U.S. Pat. No. 7,409,721 which is incorporated herein by reference for all purposes

FIELD OF THE INVENTION

The present invention relates generally to analysis of security networks. More specifically, a method and system for security network analysis based on asset analysis is disclosed.

BACKGROUND OF THE INVENTION

Computer security is an important aspect of many computer networks. As businesses and institutions become more connected and dependent on the Internet, the risk of attacks has also grown. Most of the intrusion detection systems (IDS) on the market today are capable of collecting different events on the network and displaying them.

Figure 1:
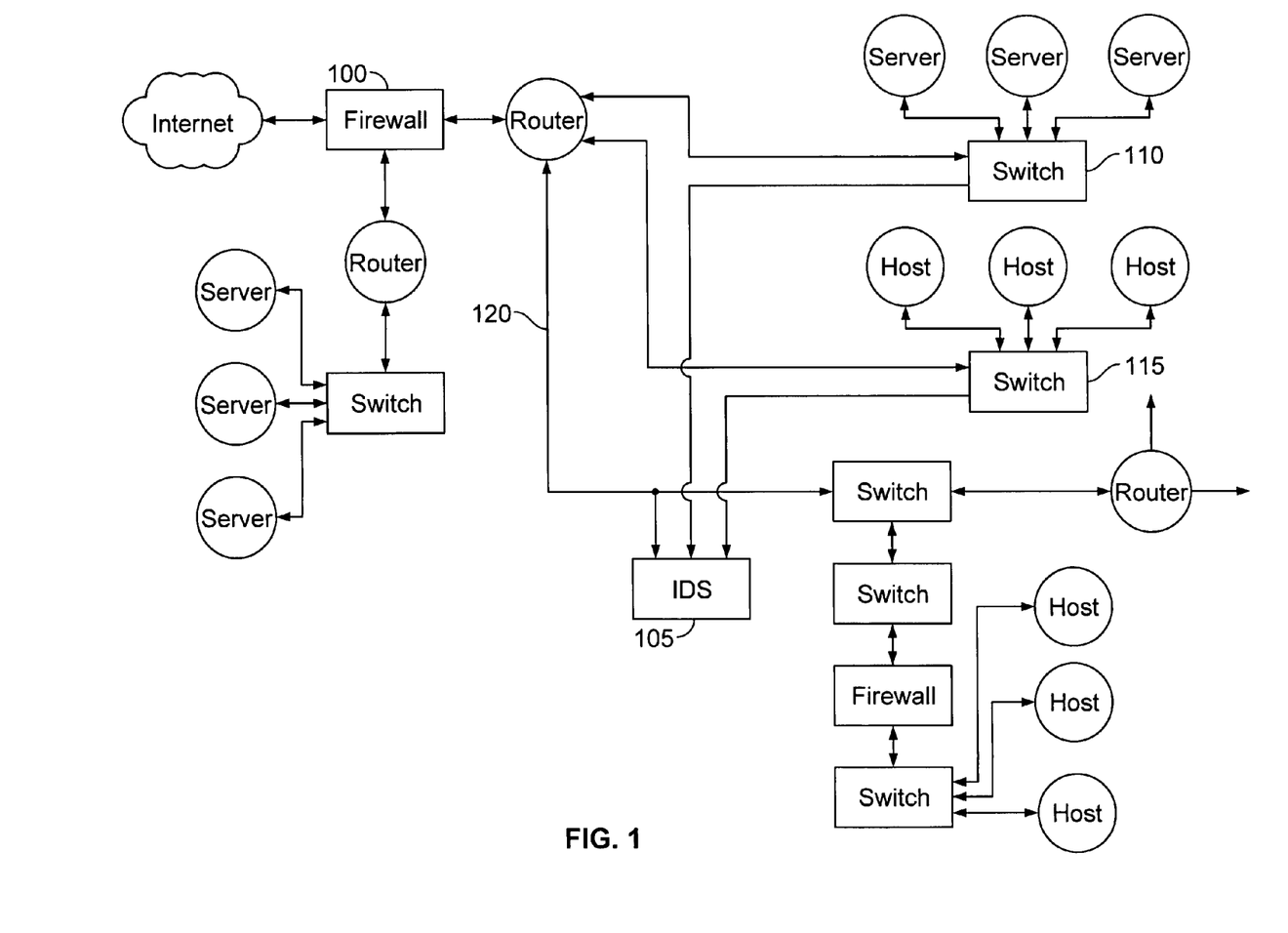
FIG. 1 is a topology diagram of an example network.

FIG. 1 is a topology diagram of an example network. A firewall 100 protects the network from the Internet. Different sections of the network are connected to each other and to the Internet via various networking devices on the network, including routers, switches, firewalls, etc. A number of servers and hosts are connected directly or indirectly to some of these networking devices. An IDS 105 collects events associated with a part of the network by connecting with certain networking devices such as switches 110 and 115, or by tapping into connection links such as link 120. The IDS may also aggregate the data collected into some central location for later retrieval and analysis, as well as provide interface for accessing the data.

A security administrator or an authorized user can use the information collected from the network to determine the nature of any suspicious activities. For example, the security administrator may identify certain critical events, examine the data collected to trace the chain of events that are associated with the critical events in order to determine where the threats come from, and then decide what responsive actions to take. Making a reasonable assessment is a time and resource intensive process, and the amount of effort spent is very much dependent on the security administrator's knowledge and experience. Also, as the network becomes more complex, the amount of data collected can be too overwhelming to be processed manually. It would be useful to have a system that can facilitate the assessment process with greater intelligence, thereby reducing the amount of time and resource needed by the process.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method and system of analyzing security risk in a computer network is disclosed. Risk levels of objects (also referred to as assets) associated with events are evaluated. An event is sometimes propagated to other related objects. The risk levels of objects may change over time. Asset relationships are constructed based on the interactions between objects and their dependencies. In some embodiments, an asset graph is used to represent the asset relationships. Techniques for tracing events are also disclosed.

The topology diagram shown in FIG. 1 shows physical links between devices. While it is useful to illustrate the topology of the network, it is often not the most effective way of representing the relationships among network objects in the context of security analysis. For instance, an authentication server and a host that interacts with the server may not have a direct network connection and may be physically remote, but an attack on the server can have a direct impact on the host so that the host and the server, from a security standpoint, are logically adjacent. The present invention constructs asset relationships among the objects on the network, and uses the asset relationships to help analyze the risk levels (also referred to as suspicion level) associated with the objects and events.

An object (also referred to as assets, network objects, nodes, or elements) comprises an entity on the network that has relevance in terms of security analysis. An object can be, and is not limited to, a physical device (such as a server, a desktop, a laptop, a router, a switch, a firewall, etc.), a software component (such as a web server process, a file, etc.), a user, as well as combinations thereof. An asset relationship between two objects exists when the events that occur on the first object affect the second object; in other words, there is an asset relationship when a dependency exists between the two objects. A suspicious event that has occurred on one object is often propagated to its primary dependent objects or targets, which may also propagate the event to other related objects. There may also be mutual dependency in some cases, where the events that occur on two objects influence each other.

The objects and their asset relationships can be constructed using a variety of methods, including dynamic analysis based on an input data stream received by the system from an event detection system or other source of events. For example, when the input is analyzed, the analysis may show that there is a source object and a destination object carrying out certain functions. It can then be derived that these two objects (the source and the destination) are in the system and there is an asset relationship between the two. In some embodiments, the assets and their asset relationships are constructed using topology discovery based on the topology of the network, or administrator or expert input that specifies the objects and relationships. In some embodiments, an asset graph is used to construct or present the logical asset relationships.

Figure 2:
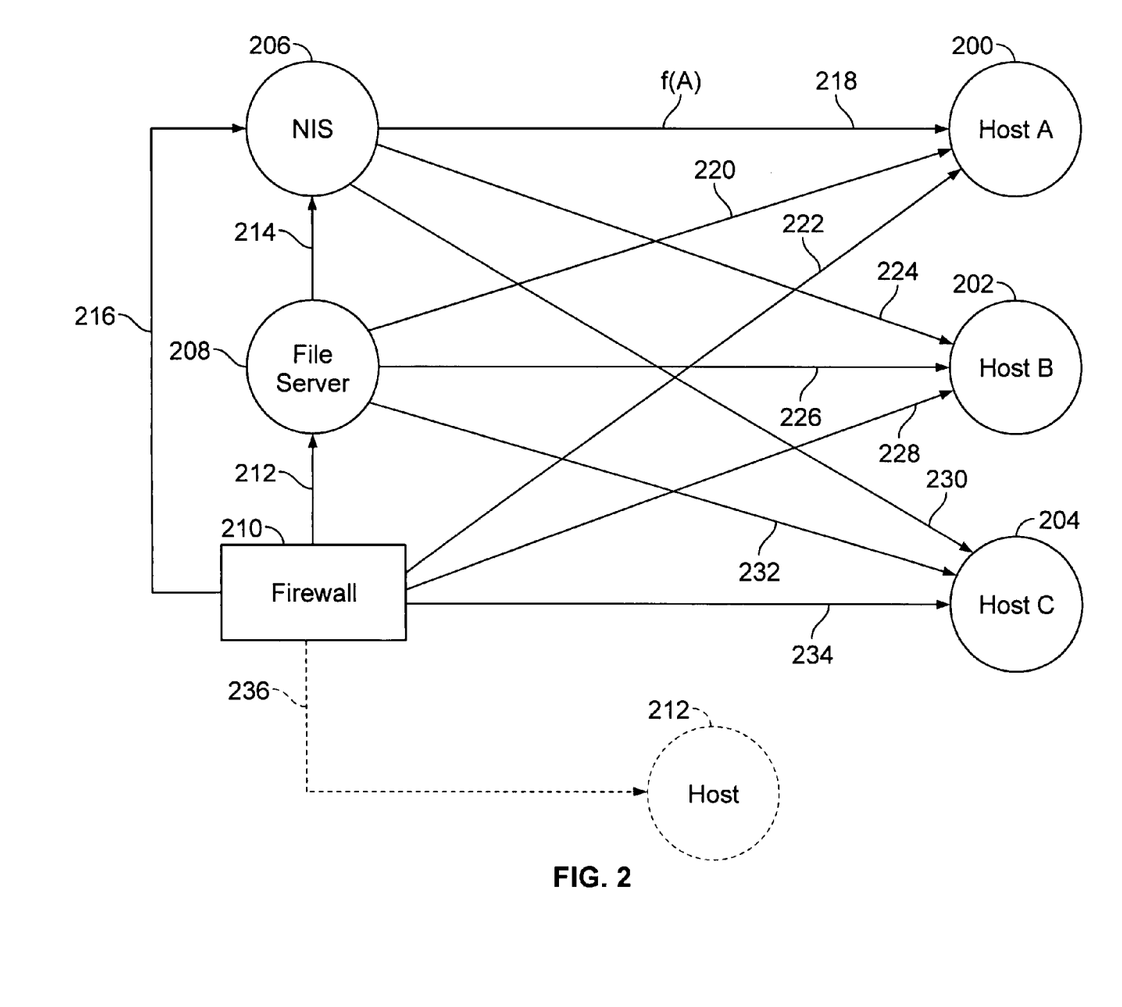
FIG. 2 is an asset graph of an example network according to one embodiment of the present invention.

FIG. 2 is an asset graph of an example network according to one embodiment of the present invention. The objects of the network include hosts A 200, B 202, C 204, a network information server (NIS) 206, a file server 208, and a firewall 210. The asset relationships between the objects are represented as arrows pointing in the direction of event propagation. For instance, NIS 206 and file server 208 are dependent on firewall 210, and are linked by arrows 216 and 212, respectively. The NIS is also dependent on the file server; therefore, these two objects are linked by an arrow 214. Hosts A, B and C are dependent on NIS 206 and are linked to NIS 206 by arrows 218, 220 and 222, respectively. Hosts A, B and C are dependent on file server 208 and are connected to file server 208 by arrows 224, 226 and 228, respectively. Hosts A, B, and C are dependent on firewall 210 and are connected to firewall 210 by arrows 230, 232, and 234, respectively. Since all hosts on the network are dependent on the firewall, this relationship is represented generally by a dashed arrow 236 pointing to a generic host object 212. It should be noted that in other embodiments, bi-directional arrows may be used to represent objects that are dependent on each other.

The object risk level of an object is calculated based on a variety of factors including the attribute information of the object (including object type, location, trust relationships, vulnerability state, etc.), events that have been detected at the object, events from other objects on which this object depends, and time dependent functions, etc.

The attribute information includes the initial, or steady state, object risk level of the object. An incoming event can change the object risk level. The change in object risk level is dependent on factors including the event type, the severity of the event, the source of the event, etc. Also, the object risk level is often time dependent. In one embodiment, when a suspicious event first occurs, the object risk level can be fairly high for the period immediately following the event. As time goes by, the object risk level associated with that event drops. For example, when it is detected that somebody from the outside is probing a server on the network, it is quite likely that there may be attacks or other harmful activities following the probing event, and thus security needs to be tightened. However, as time passes and the anticipated activities do not take place, it may be concluded that the threat has subsided. It would make sense to gradually reduce the object risk level over time, until the increase in risk level due to the probing event is diminished. There are also events that maintain a constant level of threat until further action is taken, as well as events that have an increasing effect on risk level over time if they are not countered or if they persist.

The object risk level calculation for an object is often generalized as a function or a set of functions. There are many different functions that are used to represent the asset relationships in different embodiments. For instance, in the embodiment shown, the object risk function associated with asset relationship 218 between the NIS and host A, calculated at time t is characterized as the following:

$$R_t = R_{t-1} + g(r,s) + d(t-t_0),$$

where $R_t$ is the object risk level to be calculated, $R_{t-1}$ is the object risk level of host A at last calculation, $g(r, s)$ is the event risk level of any event that just took place and either directly affects the object being updated or indirectly affects the object being updated as a result of propagation from another object, and $d(t-t_0)$ is a time function that changes the risk level over time. The time function changes the risk of the object regardless of the origin of the risk.

The term $g(r, s)$ represents the event risk level, where r denotes the intrinsic risk that depends the event's type and intensity, and s denotes the dependency on the source or object from which the event originated. The value of r may be assigned by the system or by the device that captured the event. For example, a login event is determined to pose a smaller level of threat than a port scanning event and thus the login event has a lower event risk level. The value of s is affected by the type of source and the type of connection between the source object and the object receiving the event. For example, a login event that is initiated from an object inside the firewall has less risk than a login event that is initiated from an object outside the firewall. S may be further influenced by the type of connection between the device that was the target of the event and the device that receives the propagated event from the target object. In other embodiments, the event risk level term may also depend on other factors that are deemed to be relevant. In some embodiments, certain types of events may reduce risk instead of increasing risk. When the risk level of the object is being updated, but no event has been sent to the object, $g(r, s)$ equals 0.

In the term $d(t-t_0)$, $t_0$ marks the time the object risk level was last updated. In one embodiment, d is an exponential decay function based on time and previous risk level, $R_{t-1} \cdot e^{-\gamma \cdot (t-t_{n-1})}$. If the object risk level is updated regularly, then the exponential decay can be implemented with less computation by using an approximation function such as regularly reducing the risk level by a given percentage or decay factor. In some embodiments, the risk level is a non-exponential decay function. In some embodiments, the risk level is a constant. In some embodiments, the risk level increases over time. In certain embodiments, individual decay functions may be defined for each risk component to allow for different decay rates for risks caused by different types of events.

Tables 1-5 are some examples of objects used in one embodiment of the asset graph and their attributes. Table 1 is a generic object with a basic set of attributes that are included with all the objects, whereas Tables 2-5 are specific objects used in the asset graph. Some of the attributes are complex attributes comprising multiple values. In other embodiments, the attributes and the objects are different.

TABLE 1

General Object

| Attributes | Attribute Details |
|---|---|
| Name | |
| Unique ID | |
| Suspicion Level | |
| Triggers | |
| Last updated time stamp | |

TABLE 2

Host Object

| Attributes | Attribute Details |
|---|---|
| Network address | List of addresses of host |
| Host name | List of symbolic host names |
| Class | Type of machine (server, desk top, etc) |
| Operating system | Type, version, patch level |
| Services | List of known exposed services and vulnerability state |
| Trust relationships | List of known hosts that trust and are trusted by this host |

TABLE 3

Service Object

| Attributes | Attribute Details |
|---|---|
| Ports | |
| Vulnerabilities | |
| Owner | |
| Security impact | |

TABLE 4

User Object

| Attributes | Attribute Details |
|---|---|
| Name | |
| Unique ID | User id |
| Privilege level | |
| Security impact | |

TABLE 5

File object

| Attributes | Attribute Details |
|---|---|
| Path | |
| Type | Data, executable, etc. |
| Privilege level | |
| Checksum | |
| Security impact | |

Figure 3:
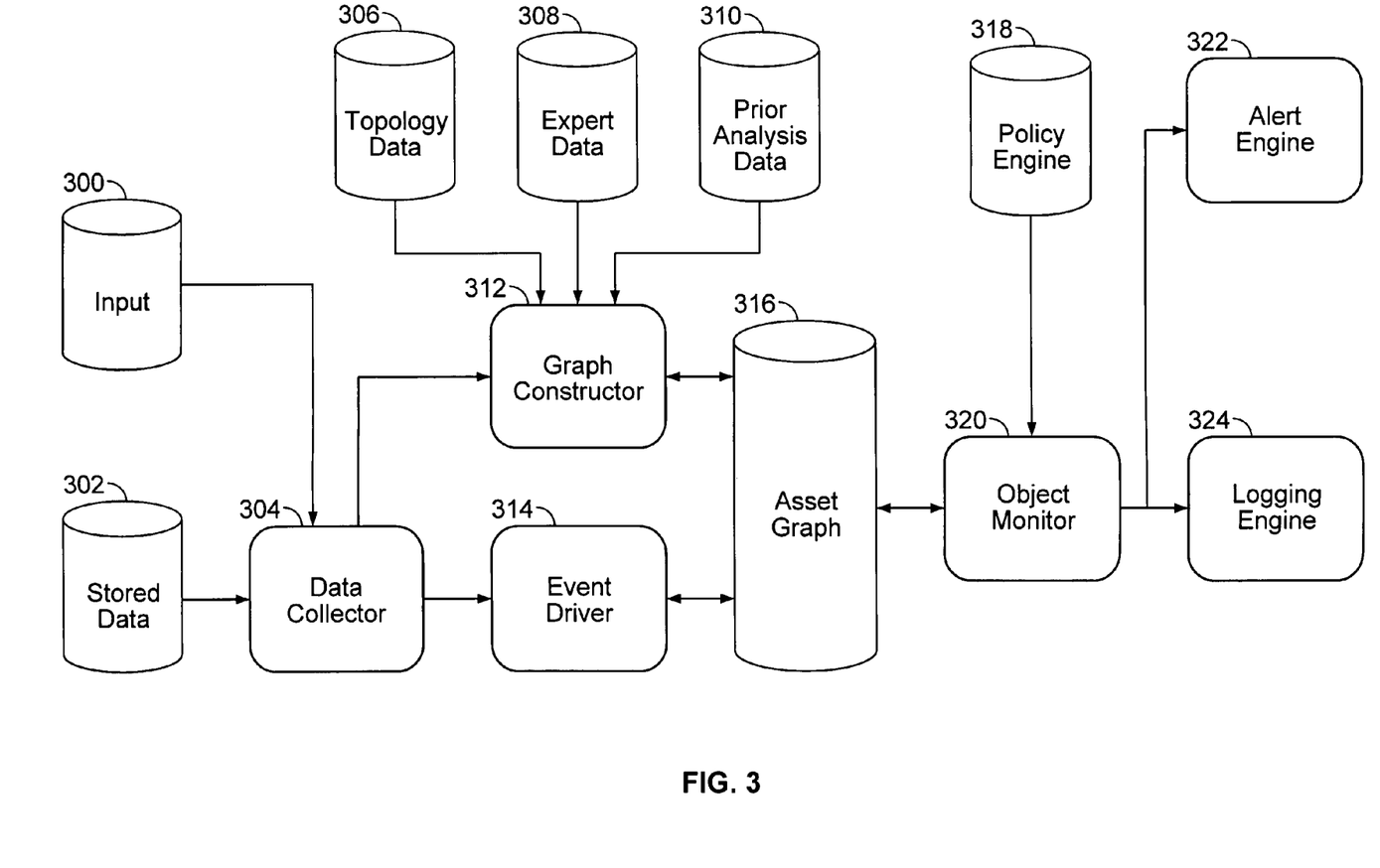
FIG. 3 is a block diagram illustrating one embodiment of a system according to the present invention.

FIG. 3 is a block diagram illustrating one embodiment of a system according to the present invention. A data collector 304 collects event data from a variety of sources, including incoming data input 300 and stored data 302. Thus, the system can both dynamically analyze event data in real time by collecting incoming input data, and analyze event data for post processing by using stored data. A graph constructor 312 constructs an asset graph 316 using different types of input information including topology data 306 that includes the topology of the network, expert data 308 that is input by someone who is knowledgeable of the network, prior analysis data 310, as well as output from data collector 304.

Data collector 304 also sends the collected event to an event driver 314, which analyzes the event data, and updates the asset graph if the event introduces changes in the objects, their attributes or their asset relationships. In addition, the event driver propagates the event according to the risk propagation functions associated with the objects in the event, and tracks the effects of the event. An object monitor 320 monitors asset graph 316 for objects that have high object risk levels. The object monitor takes inputs from policy engine 318, and reacts according to the policies to objects whose object risk levels have reached their triggering levels. The object monitor communicates with an alert engine 322 to generate an alert, and a logging engine 324 to log the event. In some embodiments, the object monitor also communicates with mail servers to generate email messages or send pages.

An event may be either a direct event that directly affects specific objects targeted by the event, or a propagated event that affects objects other than the target objects and have been propagated as a result of asset relationships between objects.

Figure 4:
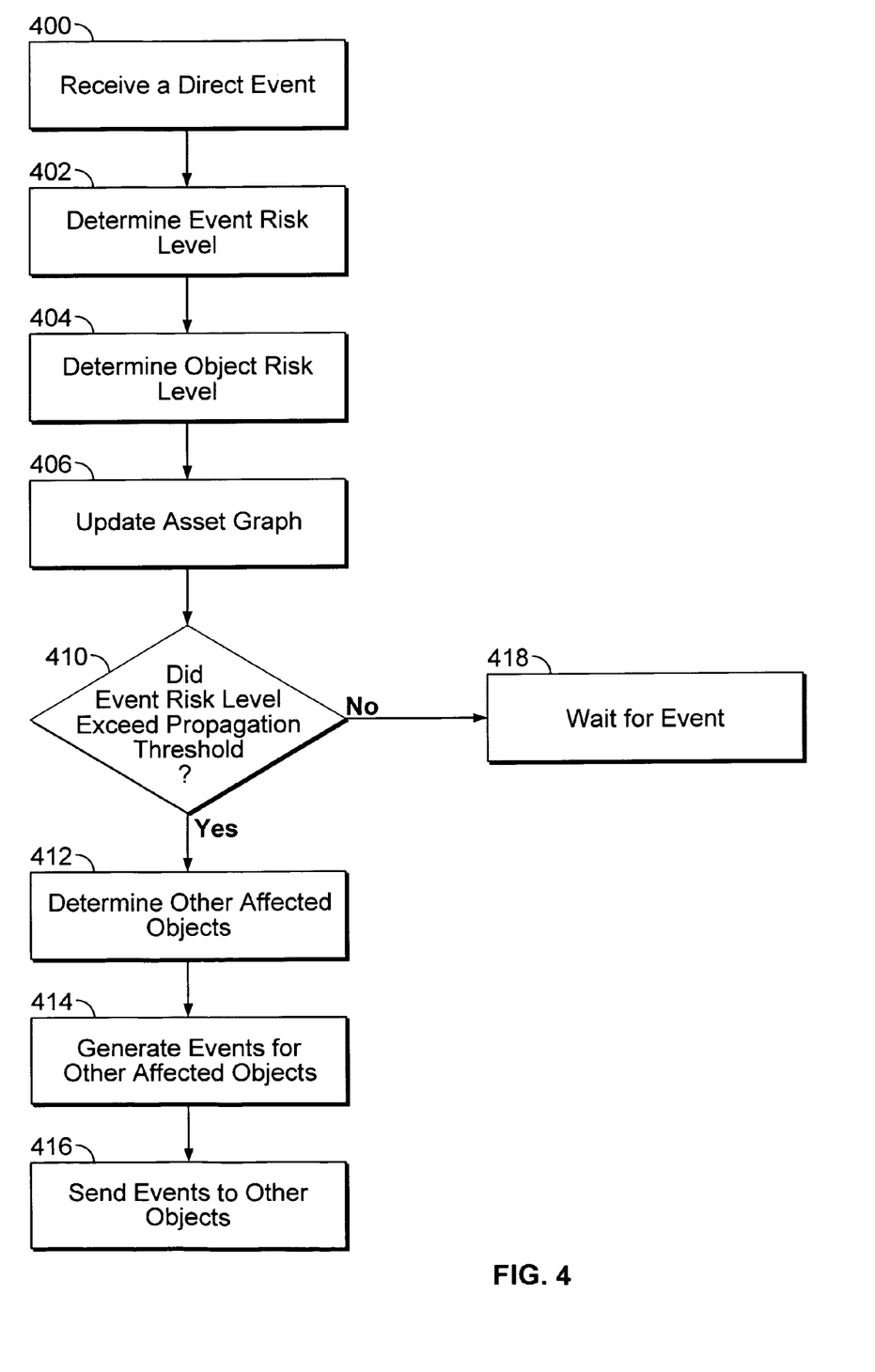
FIG. 4 is a flowchart illustrating how a new direct event is processed according to one embodiment of the present invention.

FIG. 4 is a flowchart illustrating how a new direct event is processed according to one embodiment of the present invention. A direct event is received by the system (400). An event can come from a variety of sources, including intrusion detection systems, network management systems, etc. In some embodiments, the event has an event risk level that is provided by the device that detects the event. In other embodiments, the event is reported without an event risk level by the detecting device, and the event risk level is calculated upon receiving the event. Even if an event risk level is provided by the detecting device, different detecting devices may use different scales for assigning risk levels to an event—an event risk level of 7 on a scale of 1-10 is significantly different from a risk level of 7 on a scale of 1-50. To achieve consistency, the event risk level is either normalized to produce canonical values that are arranged on the same scale, or calculated directly by the system (402).

Generally, an event may have more than one target object, that is, it may directly affect more than one object. The primarily or directly affected objects or targets of the event may include both the source and the destination of an action associated with the event. For example, the primarily affected objects of a telnet session originated from a workstation to a server include both the workstation and the server. The object risk levels of the targets are then updated based on the event risk level, the objects' time functions, the previous object risk levels, etc. (404).

The asset graph is then updated according to the object risk levels (406). In this embodiment, the object risk levels of the primary targets of the direct event are updated accordingly. If applicable, the event is propagated to related objects that are not directly or primarily affected by the event itself, but whose object risk levels should be adjusted due to the occurrence of the event and their logical association with the object or objects that were the targets of the event. To propagate the event, first it is determined whether the event risk level exceeds a propagation threshold (410). In other words, events that are not deemed risky or serious enough to warrant propagation are suppressed.

If the event risk level does not exceed the threshold, the system cleans up and becomes ready to receive events again (418). If the event risk level does exceed the threshold, the next level of affected objects is then determined (412). Events are then generated for the other affected objects based on the corresponding asset relationships and risk functions (414). Eventually, the events are sent to the other affected objects (416).

Figure 5:
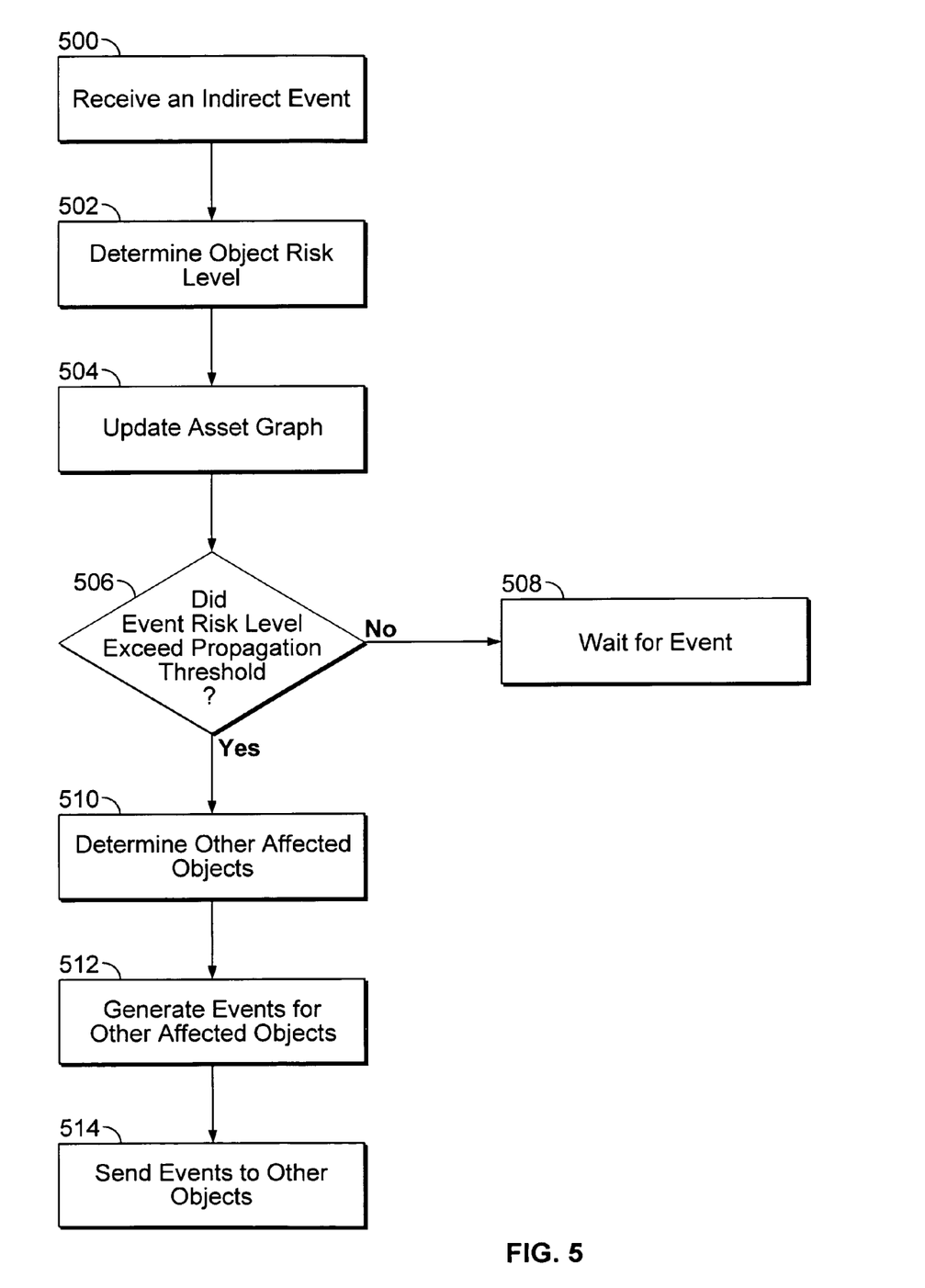
FIG. 5 is a flowchart illustrating how a new indirect event is processed according to one embodiment of the present invention.

FIG. 5 is a flowchart illustrating how a new indirect event is processed according to one embodiment of the present invention. Once an indirect event that is propagated from another object is received (500), the object risk level of the event recipient is updated directly since the event risk level was previously normalized (502). The asset graph is updated according to the object risk levels (504), and it is determined whether the event risk level exceeds the propagation threshold (506). If the risk level is below the threshold, the system cleans up and becomes ready to receive events again (508). If, however, the risk level exceeds the threshold, then other affected objects are determined (510). Events are then generated for the other affected objects based on the corresponding asset relationships and risk functions (512), and the events are sent to the other affected objects (514).

Figure 6A:
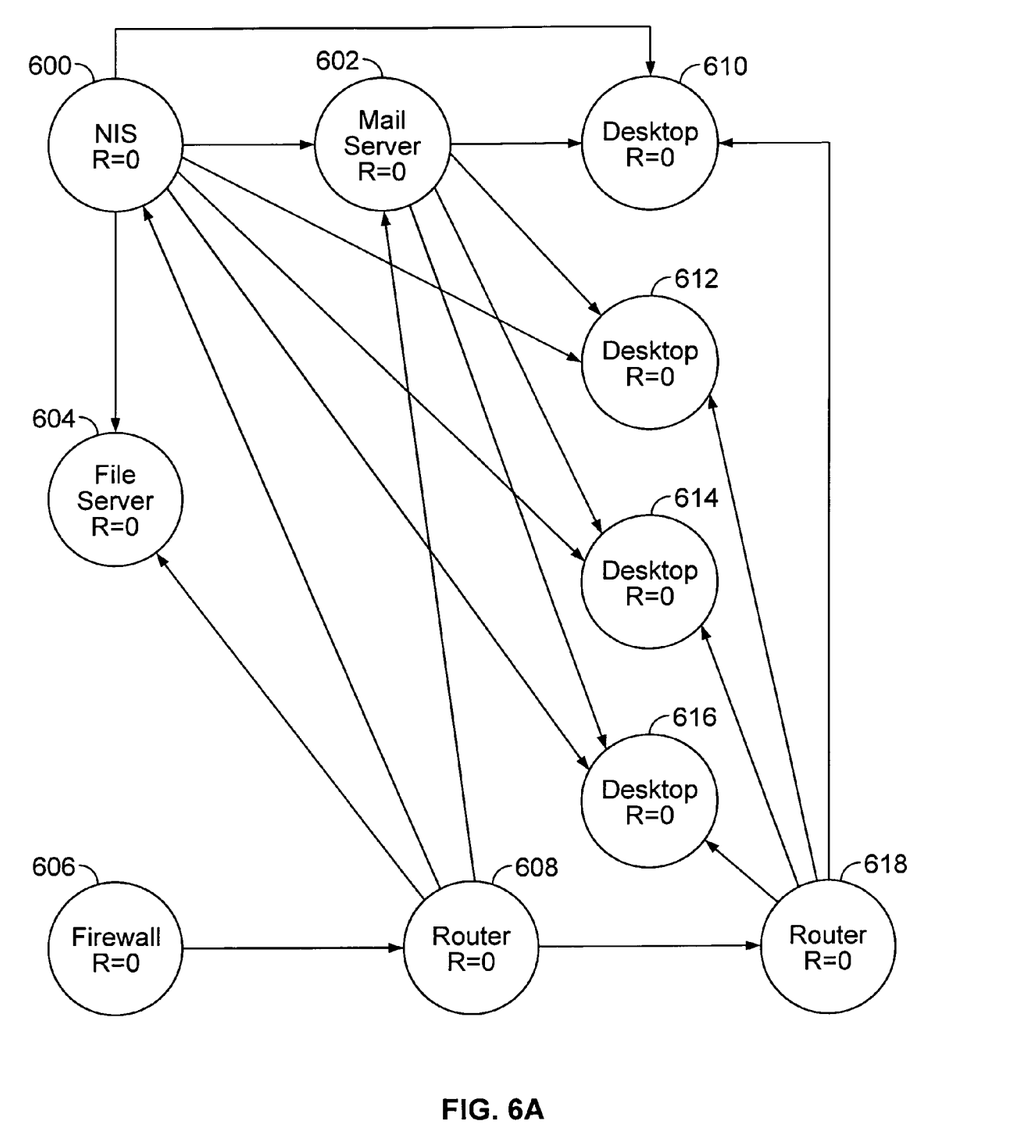
FIG. 6A-6G are a set of diagrams illustrating the evolution of risk levels of an asset graph over a sample time period, according to one embodiment of the present invention.

FIG. 6A-6G are a set of diagrams illustrating the evolution of risk levels of an asset graph over a sample time period, according to one embodiment of the present invention. FIG. 6A illustrates the initial states of the asset graph. The asset graph is constructed based on inputs including topology information provided by a network management tool and information input by an expert. The objects in this asset graph include NIS 600, mail server 602, file server 604, firewall 606, routers 608 and 618, plus desktops 610-616. R represents the canonical risk level of each object on a scale of 0-100. The higher the value, the more suspicious and risky an object is. Initially, the risk levels for all the objects are 0.

Figure 6B:
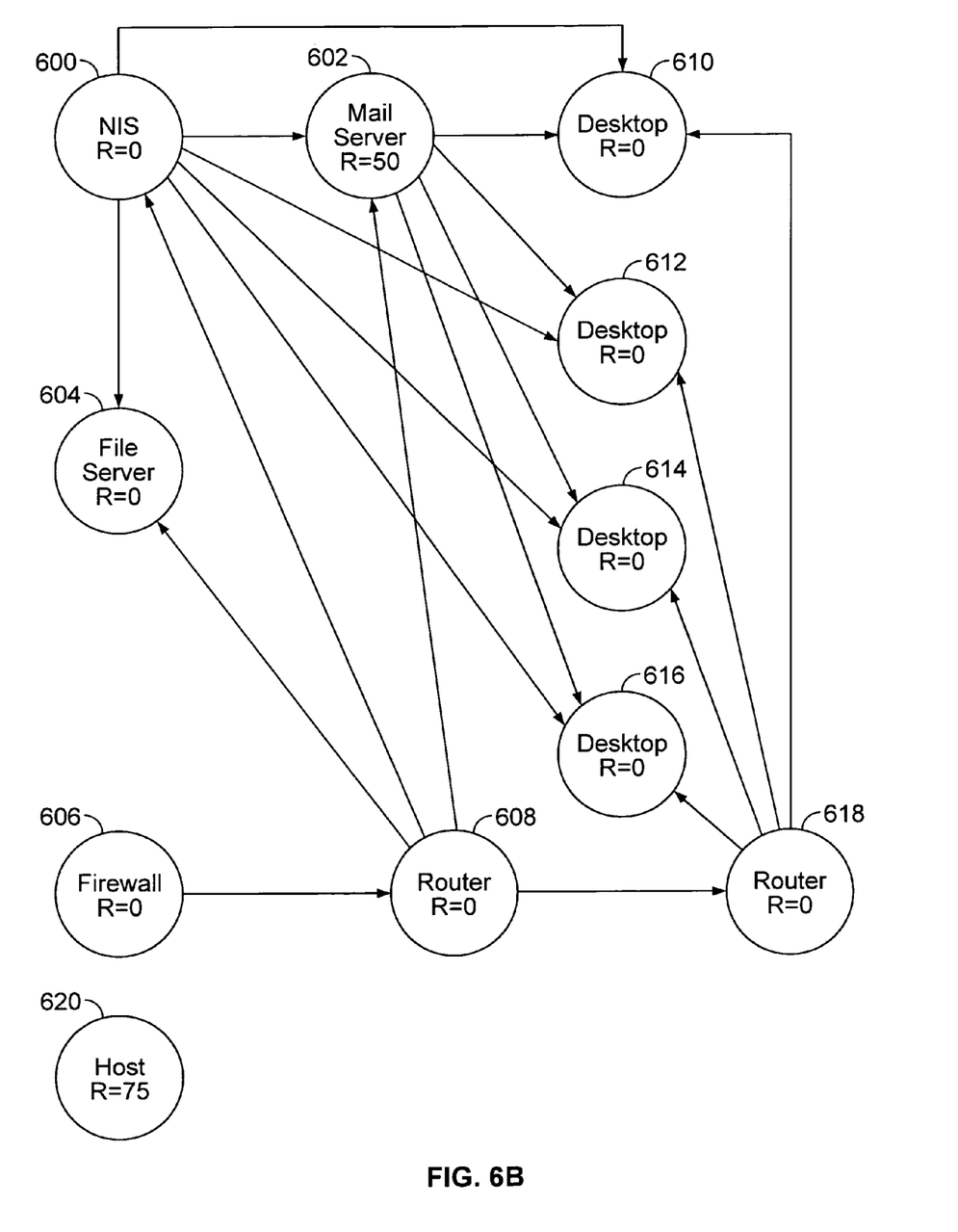

FIG. 6B shows the primary target evaluation upon receiving a first event. In this embodiment, the event is received from a network intrusion detection system sensor and is presented as the following:

172.196.10.12:5672→212.44.141.23:25 risk level=75 type=2345 time=9/1/02-19:22:11, where 172.196.10.12 is the source, and 212.44.141.23 is the destination. The source and destination of this event are the targets of the event. The event has a canonical risk level of 75 on a scale of 0-100. Type is a reference to an internal list of event types. In this embodiment, type 2345 refers to an SMTP buffer overflow attempt. The system does not have information about the source host initially, as the source host is not part of the current asset graph. A new host object 620 is created to represent the source host and added to the asset graph. Since little else is known about this new object, it is marked as highly suspicious with a risk level of 75. The destination object, on the other hand, is known. The destination maps to mail server 602, which runs an SMTP service on port 25. Thus, the mail server appears vulnerable to the exploit of the incoming event. Based on this information, the system marks the mail server as suspicious, with a risk level of 50.

Figure 6C:
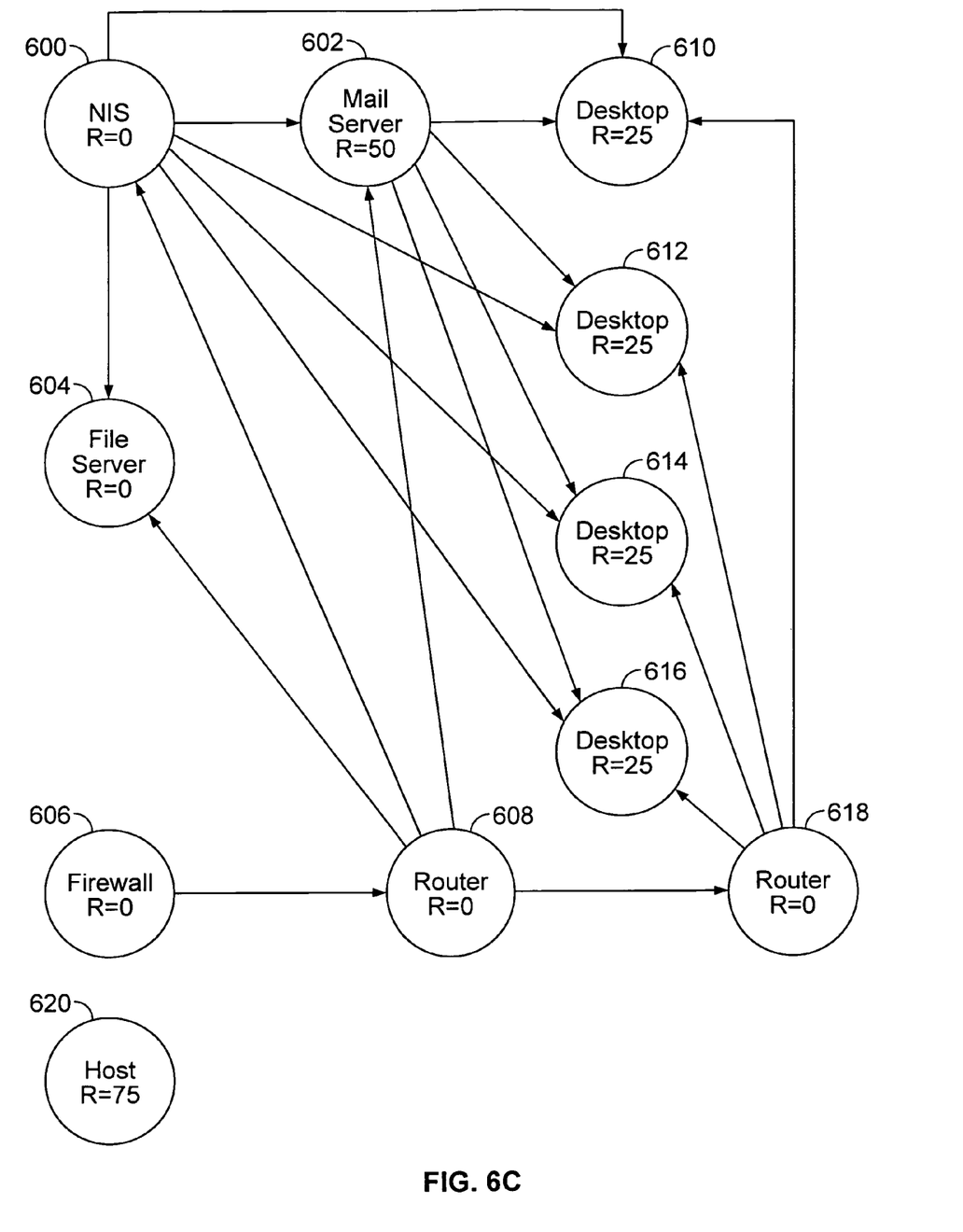

FIG. 6C illustrates the propagation effect as a result of the first event. The first primary target (source object, host 620) is examined and is determined to have no relationship with the rest of the graph. Thus, no more processing is performed on the source host object. The second primary target (destination object, mail server 602) is then examined. Desktops 610-616 interact with the mail server 602 and have asset relationships with the mail server. If the mail server is compromised, the desktops are also at risk. The system then propagates a portion of the risk to these desktops, and mark them as somewhat suspicious at a risk level of 25. Each of the desktops is also analyzed to determine whether the risk should be further propagated. For the sake of simplicity, it is assumed that the risk level at this point has fallen below the threshold and ceases to propagate.

Figure 6D:
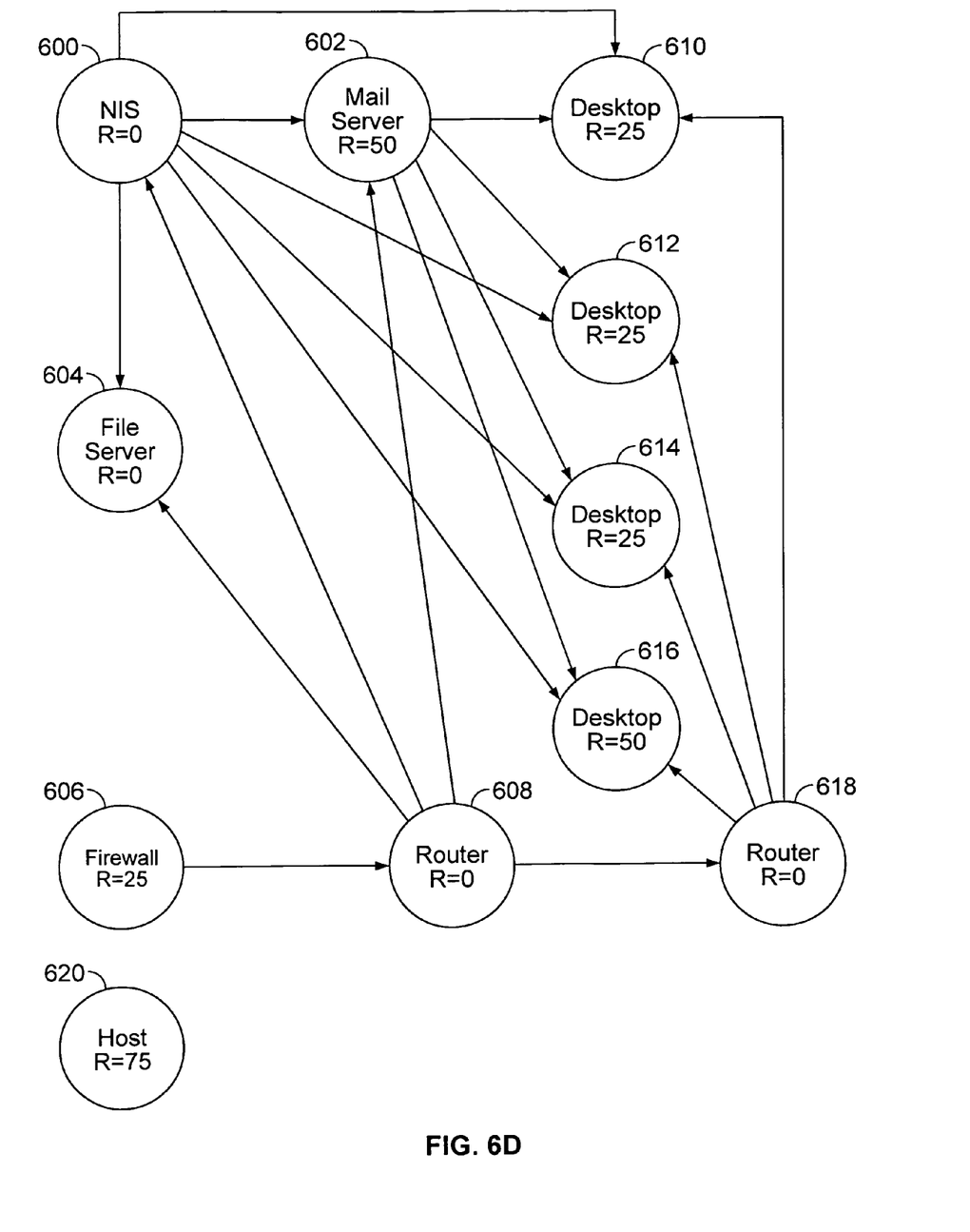

FIG. 6D illustrates how a second event is processed in the embodiment shown. Shortly after the first event was received, a second new event is received, indicating that desktop 616 (source object) is port scanning firewall 606 (destination object). The risk levels of the targets are each increased by 25. Firewall 606 now has a risk level of 25, and desktop 616 now has a risk level of 50.

Figure 6E:
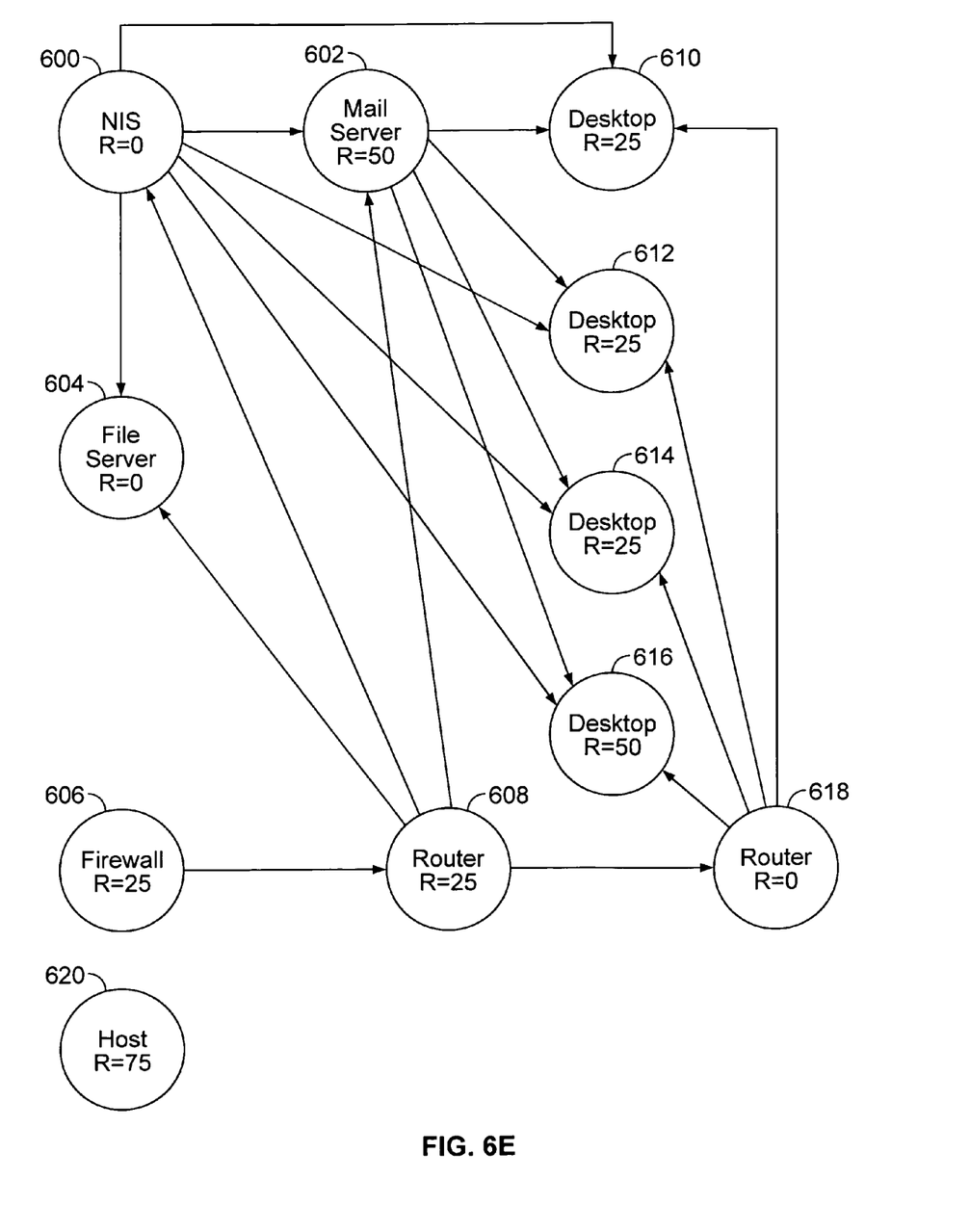

FIG. 6E illustrates the propagation of the event received in FIG. 6D. Router 608, which has an asset relationship with firewall 606, has an increase in its risk level as a result of the port scanning event being propagated.

Figure 6F:
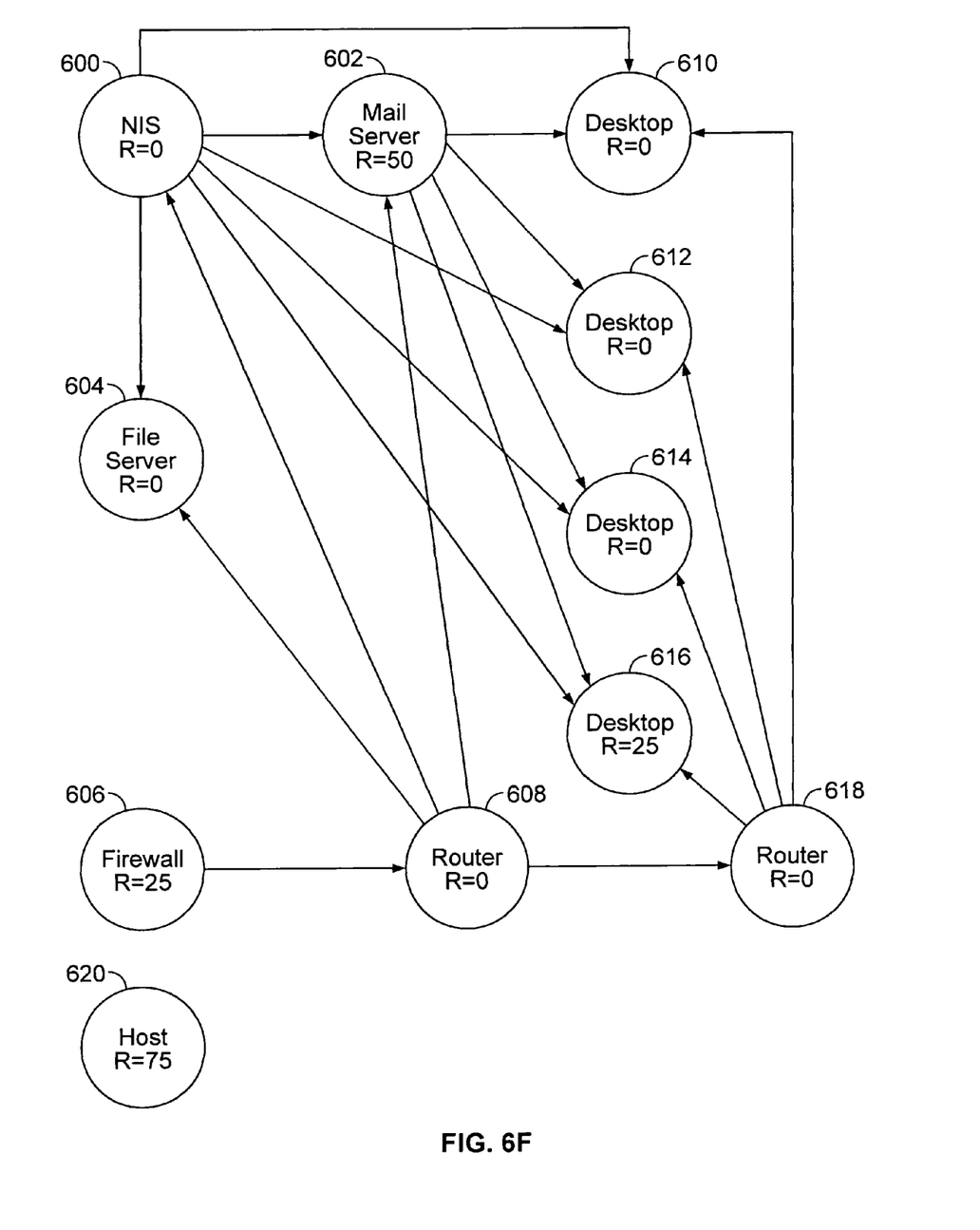

FIG. 6F illustrates the effect of the passage of time has on the embodiment shown. As time passes, the events become less relevant. The objects are reevaluated and their risk levels are reduced. All desktops except for 616 have fallen back to their original default value. However, 616 is still marked somewhat suspicious as a result of the port scanning event. Firewall 606 is still somewhat suspicious at a risk level of 25. Host 620 and mail server 602 still have fairly high risk levels at 75 and 50, respectively.

Figure 6G:
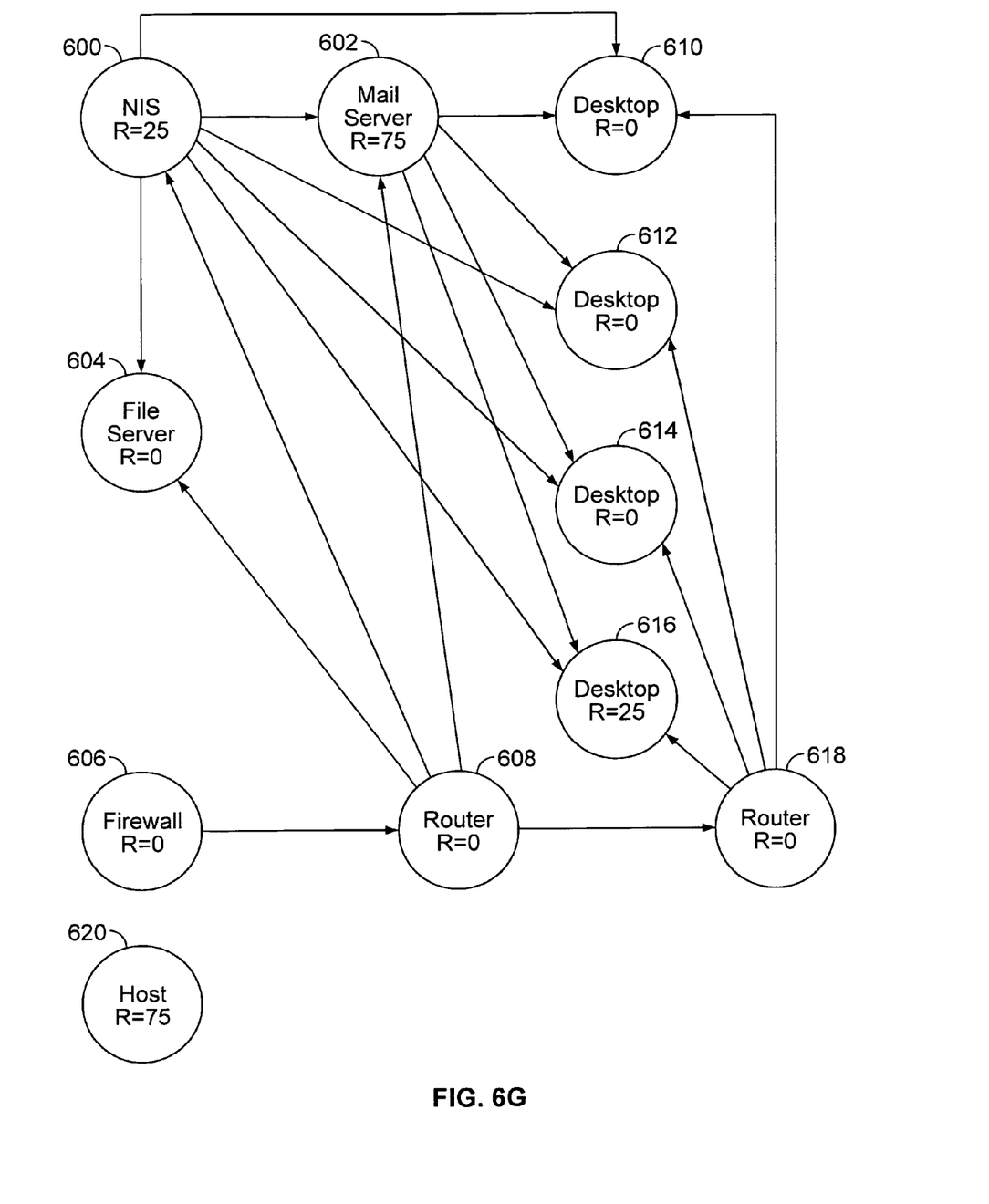

FIG. 6G illustrates the effects of a third new event. In this case the new event indicates possible port scanning activity of NIS 600 originating from the mail server. While such activity normally may not warrant an alert to be generated, when taken into account with previous events and the proximity in time, has become a bigger concern. The risk level of mail server 602 is now at 75, which triggers an alert.

In the example shown above, once mail server 602 triggers the alert, an analysis trail is produced detailing the events leading up to the alert and their effects. The system presents the data to the security administrators using text, graphics, sounds, or a combination thereof. The analysis trail can be produced independent of the risk levels. The analysis trail includes information used for tracing of event effects such as propagation and time. In some embodiments, the analysis trail is used for reconstructing a chain of events that has previously occurred, or a chain of events that leads to an intrusion or causes an object to become highly vulnerable.

Figure 7A:
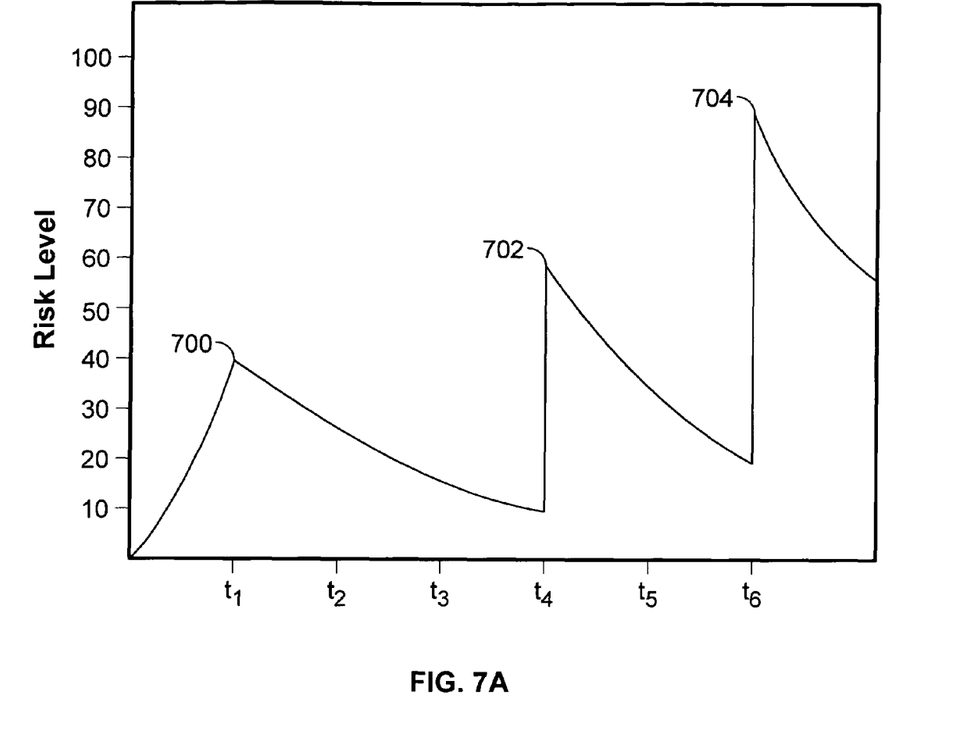
FIG. 7A is a graph illustrating the risk level of an example object A over a time period.
Figure 7B:
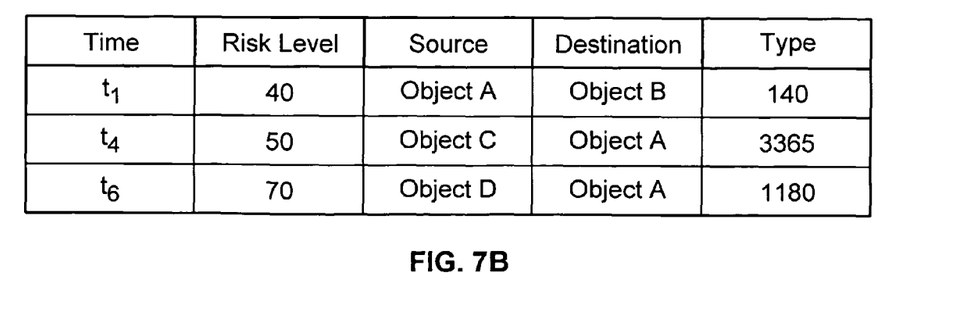
FIG. 7B is a table listing some of the properties of the events at t1, t3 and t4, including risk levels, source and destination objects, and types of event.

FIG. 7A is a graph illustrating the risk level of an example object A over a time period. The risk level is calculated periodically, from $t_1$ to $t_6$. At times $t_1$, $t_4$ and $t_6$, three events are received for this object. These events create peaks in risk level at 700, 702 and 704, respectively. Between these events, the risk level decreases over time. FIG. 7B is a table listing some of the properties of the events at t1, t3 and t4, including risk levels, source and destination objects, and types of event.

A method and system of analyzing security risk in a computer network has been disclosed. Risk level based on event type and time is used to assess the risk of objects in the network. By using techniques that employ asset relationships and asset graphs, events are better traced and presented. As a result, the amount of time and resource needed in risk management is reduced.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of analyzing security risk in a computer network comprising:
- receiving an event associated with a selected object in the computer network;
- identifying an intrinsic risk for the event depending at least in part on the event that is received;
- identifying, using a computer processor, a source risk for the event depending at least in part on a source from which the event originated, the source being a separate object from the selected object;
- determining an object risk level for the selected object based at least in part on an event risk level of the event received; wherein the event risk level accounts for the intrinsic risk and the source risk; and
- propagating, without requiring human intervention, the event to another object that is related to the selected object according to asset relationships in the computer network, in the event that the event risk level exceeds a propagation threshold, wherein the asset relationships do not require a dependency relationship.

2. The method of claim 1, wherein the event risk level depends at least in part on a detecting device that detects the event and provides the event risk level.

3. The method of claim 1, wherein the intrinsic risk depends at least in part on event type and intensity.

4. The method of claim 1, wherein the object risk level is further based at least in part on a time function that changes the object risk level over time.

5. The method of claim 4, wherein the time function includes a decay function that is defined differently for different event types.

6. The method of claim 4, wherein the time function indicates a time dependent risk level following a probing event.

7. The method of claim 4, wherein the time function changes the object risk level regardless of risk origin.

8. The method of claim 1, wherein the source risk level depends at least in part on a connection between the source and the selected object that receives the event.

9. A system for analyzing security risk in a computer network comprising, comprising:
- a processor configured to:
  - receive an event associated with a selected object in the computer network;
  - identify an intrinsic risk for the event depending at least in part on the event that is received;
  - identify a source risk for the event depending at least in part on a source from which the event originated, the source being a separate object from the selected object;
  - determine an object risk level for the selected object based at least in part on an event risk level of the event received; wherein the event risk level accounts for the intrinsic risk and the source risk;
  - propagate, without requiring human intervention, the event to another object that is related to the selected object according to asset relationships in the computer network, in the event that the event risk level exceeds a propagation threshold, wherein the asset relationships do not require a dependency relationship; and
- a memory coupled to the processor and configured to provide the processor with instructions.

10. The system of claim 9, wherein the event risk level depends at least in part on a detecting device that detects the event and provides the event risk level.

11. The system of claim 9, wherein the intrinsic risk depends at least in part on event type and intensity.

12. The system of claim 9, wherein the object risk level is further based at least in part on a time function that changes the object risk level over time.

13. The system of claim 12, wherein the time function includes a decay function that is defined differently for different event types.

14. The system of claim 12, wherein the time function indicates a time dependent risk level following a probing event.

15. The system of claim 9, wherein the source risk level depends at least in part on a connection between the source and the selected object that receives the event.

16. A non-transitory computer readable storage medium for analyzing security risk in a computer network comprising computer instructions for:
- receiving an event associated with a selected object in the computer network;
- identifying an intrinsic risk for the event depending at least in part on the event that is received;
- identifying, using a computer processor, a source risk for the event depending at least in part on a source from which the event originated, the source being a separate object from the selected object;
- determining an object risk level for the selected object based at least in part on an event risk level of the event received; wherein the event risk level accounts for the intrinsic risk and the source risk; and
- propagating, without requiring human intervention, the event to another object that is related to the selected object according to asset relationships in the computer network, in the event that the event risk level exceeds a propagation threshold, wherein the asset relationships do not require a dependency relationship.

17. The non-transitory computer readable storage medium recited in claim 16, wherein the object risk level is further based at least in part on a time function that changes the object risk level over time.

18. The method of claim 1, further comprising propagating the event to the source object.

* * * * *